United States Patent
Fu et al.

(10) Patent No.: US 6,292,906 B1
(45) Date of Patent: Sep. 18, 2001

(54) METHOD AND APPARATUS FOR DETECTING AND COMPENSATING FOR CERTAIN SNOOP ERRORS IN A SYSTEM WITH MULTIPLE AGENTS HAVING CACHE MEMORIES (75) Inventors: John W. C. Fu, Saratoga; Muthurajan Jayakumar, Sunnyvale, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/992,024

(22) Filed: Dec. 17, 1997

(51) Int. Cl.[7] ...................................................... G06F 11/16
(52) U.S. Cl. ................................................. 714/6; 711/146
(58) Field of Search ................................... 711/100, 113, 711/117, 118, 119, 120, 130, 133, 141–146, 140, 131, 111; 714/2, 6, 8, 13, 25, 26, 27, 30, 41, 48, 56, 100, 53, 54, 43, 799, 800, 42, 49, 758

(56) References Cited

U.S. PATENT DOCUMENTS

| | | | |
|---|---|---|---|
| 5,339,322 | * | 8/1994 | Rasteger ............................. 714/805 |
| 5,446,873 | * | 8/1995 | Chan ........................................ 714/1 |
| 5,572,703 | * | 11/1996 | MacWilliams et al. ............. 711/146 |
| 5,682,516 | * | 10/1997 | Sarangdhar .......................... 711/146 |
| 5,787,468 | * | 7/1998 | Clark .................................... 711/121 |
| 5,796,977 | * | 8/1998 | Sarangdhar .............................. 709/1 |
| 5,797,026 | * | 8/1998 | Rhodehamel ........................... 712/1 |
| 5,832,250 | * | 11/1998 | Whittaker ............................. 714/144 |
| 5,845,309 | * | 12/1998 | Shirotori ................................. 711/3 |
| 5,905,902 | * | 5/1999 | O'Conner ............................... 712/1 |
| 5,909,699 | * | 6/1999 | Sarangdhar .......................... 711/146 |
| 5,916,314 | * | 6/1999 | Berg ........................................ 714/6 |

* cited by examiner

Primary Examiner—John F. Niebling
Assistant Examiner—Stacy Whitmore
(74) Attorney, Agent, or Firm—Jeffrey S. Draeger (57) ABSTRACT

A method and apparatus for handling cache snoop errors. According to one method disclosed, a snoop cycle having a snoop address is generated by a first bus agent. A second bus agent detects a snoop error in response to that bus cycle. As a result of the detected snoop error, the snoop error is signaled to the first bus agent, the bus agent which generated the snoop cycle.

20 Claims, 4 Drawing Sheets

METHOD AND APPARATUS FOR DETECTING AND COMPENSATING FOR CERTAIN SNOOP ERRORS IN A SYSTEM WITH MULTIPLE AGENTS HAVING CACHE MEMORIES

BACKGROUND OF THE INVENTION

1. Field of the Invention

The present invention pertains to the field of cache memories. More particularly, the present invention pertains to the field of handling errors caused by the loss of information stored in cache memory cells.

2. Description of Related Art

As computer systems are increasingly relied on for business, technical, and personal tasks, the importance of computer system reliability also increases. In particular, complex multiple processor systems are often used in applications in which reliable operation is highly desirable if not crucial. Unfortunately, the risk of a system failure due to a memory error increases as more and more processors and cache memories are added to the system. Thus, it would be advantageous to develop techniques to limit the adverse impact of errors in multiple processor systems and/or multiple cache memory systems.

One particular type of memory failure which is exacerbated by continuing advances in computer systems is that of cache data corruption due to "soft errors." As opposed to "hard errors," which result from design flaws, "soft errors" typically occur due to extra terrestrial radiation (e.g., cosmic rays) or alpha particle radiation from packaging materials. Thus, while a hard error can be repeated by subjecting the computer system to the exact same operating sequence, soft errors are more like random events, and thus are inherently unpredictable.

One major source of soft errors is the impingement of radiation such as alpha particles upon a semiconductor device. In particular, memory cells are very susceptible to alpha particle radiation because the impinging alpha particle may reverse the charge used to store data within the memory cell. When such a soft error is caused in a memory cell being used to store data or instructions for a program, a system failure may occur if error detection and containment or recovery is not performed.

As technological advances allow smaller and smaller memory devices, the likelihood of a soft error increases for two reasons. First, a smaller memory cell stores less charge and accordingly is more easily discharged or reversed by the impact of an alpha particle. Secondly, the decreasing cell size allows arrays of larger numbers of cells, further increasing the number of possible error locations. Thus, both increasing numbers and decreasing charge storage of memory cells increase the soft error problem.

Since modern high power computer systems extensively use cache memories to increase system performance, the detection and correction of soft errors in system cache memories has become increasingly important. Furthermore, since many processors include integrated cache memories, the use of multiple processors in a system heightens the risk of memory errors which may adversely affect system operation. Thus, a technique which effectively deals with soft errors in a multi-processing system without disrupting system operation could increase reliability of such systems.

One prior art approach to dealing with cache errors in a multi-processing system is exemplified by the technique used in the Pentium® Processor line available from Intel Corporation of Santa Clara, Calif. Intel Pentium® II processors may enable an internally generated machine check exception to deal with certain cache snoop errors which are caused by cache data corruption. The machine check exception causes the processor to run routines which may determine whether or not it is possible to recover from the snoop error. A recoverable error may occur if the cache line was in any state except for modified since unmodified cached data can be found elsewhere in the system.

Some prior art systems employ data integrity tests for the data stored within the cache data entries. An error correction code may be used to detect not only when an entry has been corrupted, but also how that corrupted entry might be restored. Such data recovery requires substantial overhead to store sufficient additional error checking bits to reconstruct the corrupted data and to perform the correction.

Cache tag arrays are often much smaller than the actual cache data arrays and consequently may be less likely to become corrupted. A tag array failure, however, prevents a cache memory from accurately determining whether the cache contains a particular address. Thus, in prior art systems, cache snoop cycles cannot be properly performed if the tags are corrupted. Since cache snoop cycles are crucial in most systems to maintaining system cache coherency, the inability to handle snoop errors without disrupting system operation may be detrimental to overall system performance.

One reason for the inability of prior art systems to handle cache snoop errors in a manner which limits system disruption is that prior art systems do not report snoop errors to the entire system during the snoop bus cycle. Not reporting snoop errors to other caches or cache control logic in the system prevents the snooping bus agent from making a decision whether the snoop error can be ignored at least temporarily, and least by the snooping bus agent. Indeed, there are situations where interrupting system operation (e.g., using the mentioned machine check interrupt) may unnecessarily slow system operation because the interrupt occurs regardless of whether other bus agents in the system could immediately provide the requested information without resolving the corrupt data problem.

For example, if a snooping bus agent encounters corrupt data in a first cache, but a second system cache contains a valid copy of the data, the snooping bus agent could obtain the valid data from the second cache memory and continue operating. Thus, the snooping bus agent could be improved to at least temporarily ignore the error during the snoop cycle which accessed the corrupt data; however, the first cache may also need to respond to the detection of the corrupt entry.

Unfortunately, prior art systems which do not communicate snoop errors at the system level can not determine whether the corrupt data can be ignored by the snooping bus agent. Furthermore, prior art systems do not specifically deal with corrupted tag entries at a system level. This results, in some cases, in a routine (e.g., a machine check routine) being run in an attempt to resolve the corrupted cache entry problem prior to the time at which it is actually required. In other cases, it may be more than a matter of merely delaying an inevitable error recovery routine since the cache with a corrupt entry may be flushed or the corrupt entry replaced, altogether obviating the need to run the recovery routine.

Thus, the prior does not provide a system which adequately allows cache snooping errors to be handled in a non-disruptive manner. Containing and recovering from memory errors such as snoop errors is becoming increasingly important as increasing memory sizes, decreasing device sizes, and increasing levels of multiprocessing elevate the overall risk of a memory error somewhere in the computer system. Thus, it would be advantageous to reduce the disruption of the operation of a system which encounters an error while snooping other system caches.

SUMMARY

A method and apparatus for handling cache snoop errors is disclosed. According to one method disclosed, a snoop cycle having a snoop address is generated by a first bus agent. A second bus agent detects a snoop error in response to that bus cycle. As a result of the detected snoop error, the snoop error is signaled to the first bus agent, the bus agent which generated the snoop cycle.

BRIEF DESCRIPTION OF THE FIGURES

The present invention is illustrated by way of example and not limitation in the figures of the accompanying drawings.

DETAILED DESCRIPTION

The present invention provides a method and apparatus for handling some cache snoop errors in a non-disruptive manner. In the following description, numerous specific details such as signal names, bus agent types, and circuit implementations are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included functional descriptions, will be able to implement the necessary logic circuits without undue experimentation.

The present invention allows a system to intelligendy minimize disruption when cache snoop errors occur by applying system level intelligence. The techniques of the present invention may be applied to any cache which can detect snoop errors caused by tag corruption, data corruption, or other types of failures. For example, if a cache is capable of detecting and signaling data corruption errors but can not correct such errors, the techniques of the present invention may be used to minimize the system wide impact of such data corruption. Similarly, if cache tag memories do not contain circuitry to correct tag data corruption, the techniques of the present invention may also minimize the impact of tag corruption. By limiting the impact of cache memory corruption errors, the present invention improves reliability in systems where multiple caches and/or multiple processors with caches are being used.

Figure 1:
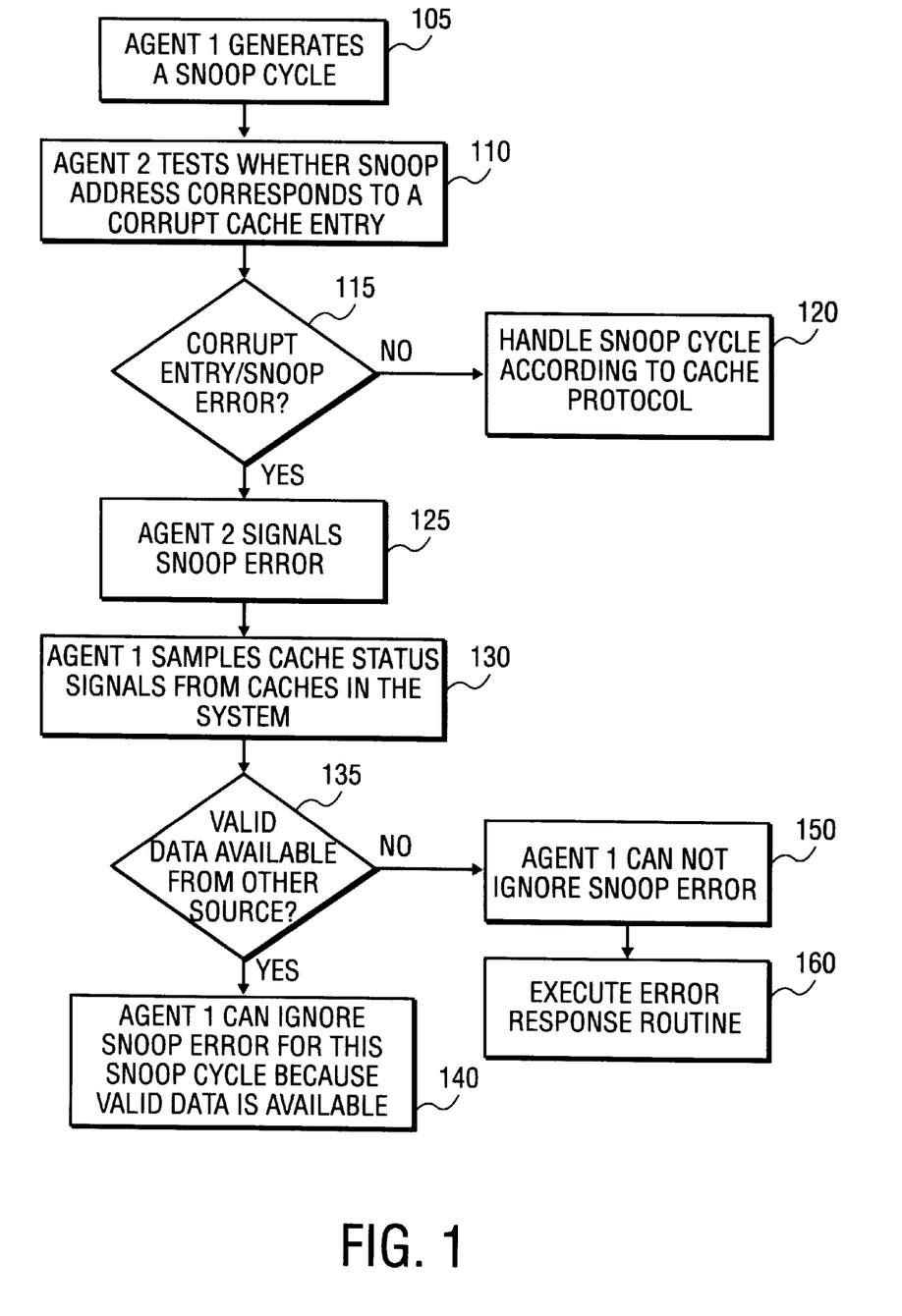
FIG. 1 illustrates one embodiment of a method for handling cache snoop errors according to the present invention.

FIG. 1 illustrates one embodiment of a method for handling cache snoop errors according to the present invention.

In step 105, a first bus agent generates a snoop cycle which is placed on a system bus. Such snoop cycles typically include at least one control signal which indicates that the cycle is a snoop cycle as well as a snoop address indicating a memory location for which system wide consistency needs to be maintained. As indicated by step 110, a second bus agent tests whether the snoop address corresponds to a corrupt cache entry controlled by that second bus agent. In a system having more than two bus agents with caches, each bus agent may perform a similar test for corrupt cache entries. The detection of corrupt cache entries may be performed by any available data integrity checking system such as the use of parity or error correction bits.

As indicated by step 115, different steps will be taken depending on whether a corrupt cache entry is detected because that corrupt cache entry indicates that a snoop error has occurred. As shown in step 120, if no snoop error occurred, the snoop cycle is handled according to the cache protocol being used in the system. On the other hand, if a snoop error has occurred, the second bus agent signals a snoop error as indicated in step 125.

The first bus agent receives a signal indicating that the snoop error occurred, and, as shown in step 130, also samples cache status signals from caches in the system. These cache status signals are analyzed to determine whether there is valid data available from any other source in the system other than the cache which had a corrupt cache entry at the snoop address. If it is determined in step 135 that valid data is not available from another source, the first bus agent can not ignore the snoop error as shown in step 150. The unavailability of data from another source indicates that the cache entry which was corrupted may have contained modified data which was not available in any other cache in the system. As a result, it may not be possible to reconstruct that data, and an error response routine needs to be executed to respond appropriately as shown in step 160.

If, on the other hand, valid data is available from another source in the system, the first bus agent can ignore the snoop error which was signaled by the second bus agent as is shown in step 140. This is due to the fact that cache coherency is maintained between system caches. If the corrupted entry in the second bus agent had been modified and only reflected in that cache, the corresponding entries should have been marked invalid in other system caches. Thus, the existence of valid data in a cache other than that controlled by the second bus agent indicates that the corrupted data was duplicative.

If system level intelligence by way of examining cache status signals from caches in the system is not employed, the system may in effect overreact to corrupt data by assuming that it needs to be immediately rectified. Additionally, if the corruption of data prohibits properly responding to the snoop cycle, a system may be indeterminately and unnecessarily delayed where a system of the present invention would recognize the existence of corrupt data and perhaps that the corrupt data is unnecessary, and would proceed without awaiting any completion of the snoop cycle.

Figure 2:
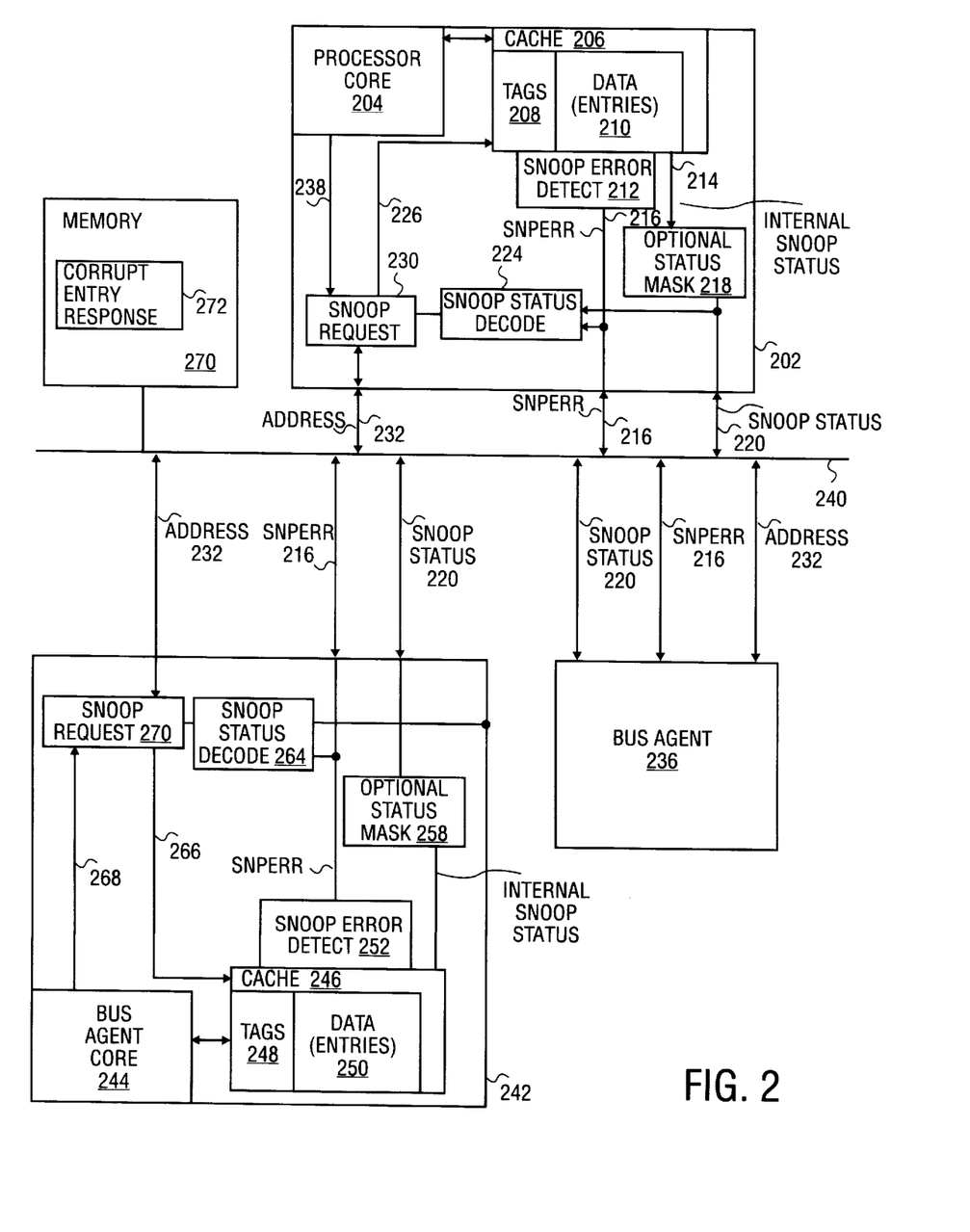
FIG. 2 illustrates one embodiment of a system of the present invention which may operate according to the method shown in FIG. 1.

One system level embodiment of the present invention employing these techniques is illustrated in FIG. 2. FIG. 2 illustrates details of a first bus agent 202 and a second bus agent 242. Also illustrated are a third bus agent 236 and a memory 270 containing a corrupt entry response routine 272. Each of the bus agents 202, 242, and 236 as well as the memory 270 are coupled to communicate via a system bus 240.

The bus agents 202 and 242 are shown containing similar circuitry except for the fact that the first bus agent 202 contains a processor core 204 whereas the second bus agent 242 includes a bus agent core 244. Both the bus agent 202 and the bus agent 242 could be processors in one embodiment, making the bus agent core 244 a processor core in that embodiment. On the other hand, these bus agents could be any other bus agent which either contains a cache memory or controls a cache memory such that the bus agent may need to respond to snoop cycles.

The bus agent 202 includes a cache 206 which is coupled to the processor core 204 and which has tags 208 and a data array 210 which contain entries comprising either data, instructions, or addresses when the cache 206 is operational. A snoop error detect circuit 212 is coupled to the cache 206 to generate a snoop error signal on line 216 when a snoop cycle has referenced an entry in the cache 206 which is corrupted. The snoop error signal is conveyed to the system bus 240 so that other bus agents in the system may respond in a timely manner. The use of an inter-cache or externally generated (i.e., one which may be sampled by other bus agents) snoop error signal represents an improvement over the prior art because prior systems, which are unable to externally indicate that an error has occurred during a snoop cycle, may leave other bus agents indefinitely awaiting a response.

The bus agent 202 also includes a snoop request circuit 230 which is coupled to receive a snoop address from the system bus over signal lines 232. The snoop request circuit 230 can convey snoop requests to the cache 206 via signal lines 226. Additionally, the snoop request circuit 230 can receive signals via a signal line 228 indicating that the bus agent 202 needs to perform a snoop cycle. The snoop request circuit 230 appropriately relays such snoop cycles to the system bus 240.

In response to external snoop requests, the cache 206 generates internal snoop status signals on signal lines 214. Theses internal snoop status signals indicate whether the cache 206 appears to contain an entry corresponding to the snoop address. These internal snoop status signals do not include information regarding whether the cache entry is in fact corrupt, as that information is determined by the snoop error detect circuit 212. In some embodiments, an optional status mask circuit 218 is used to reflect the outcome of the snoop error detection in the external versions of the snoop status signals which are conveyed to the system bus on signal lines 220. Notably, the masking may need to be performed based on an internal version of the snoop error signal otherwise any system snoop error could mask all hit signals. Thus, in embodiments using this masking technique, snoop status signals (such as HIT and HITM signals) are only conveyed to the system bus 240 if the appropriate tag and/or cache data are not corrupted.

The bus agent 202 also includes a snoop status decode circuit 224 which is utilized when the bus agent 202 itself is requesting a snoop cycle on the system bus to test other system caches. The snoop status decode circuit 224 receives the plurality of snoop status signals from the system bus 240 over signal lines 220 as well as the snoop error signal on signal line 216. In one embodiment, a single snoop error signal line and a single set of snoop status signal lines are shared by all of the bus agents on the system bus 240. In this embodiment, the optional status mask circuit 218 is employed to ensure that snoop status signals indicating that valid and/or modified data are available in a system cache are only asserted by caches which are not accessing corrupt tags and/or corrupt data. Thus, in such a system, if the status signals indicate valid data is present in the system, such indication means that the valid data is not corrupted and that the snoop error signal may be at least temporarily ignored.

In other embodiments, the snoop status decode circuit 224 may be implemented differently and/or at a system level rather than distributed throughout the various bus agents. For example, a snoop error signal and separate snoop status signals from each bus agent which controls a cache memory may be routed to a centralize snoop status decoder. Such an embodiment would advantageously centralize snoop status decision making; however, the smaller number of system level signal lines possible in a decentralized approach may be preferable.

The bus agent 242 contains similar components and operates in a similar fashion to the bus agent 202. This bus agent contains a bus agent core 242 which communicates with a cache 246. The cache 246 includes tags 248 and a data array 250, each containing entries when the cache is operational. A snoop error detect circuit 252 is coupled to the cache to detect errors in snoop cycles and to assert the snoop error signal on the signal line 216 when such a snoop error is detected. The bus agent 242 also contains a snoop request circuit 270 which is coupled to the bus agent core 244 via signal lines 268 and which is coupled to the cache 246 via signal lines 266. The snoop request circuit 270 may function in the same fashion as the snoop request circuit 230 discussed with respect to the bus agent 202.

The bus agent 242 also contains a snoop status decode circuit 264 which is coupled to receive snoop status signals and the snoop error signal. The snoop status decode circuit 264 also performs in an analogous fashion to the corresponding circuitry in the bus agent 202. Finally, the bus agent 242 includes an optional status mask circuit 258 which receives internal snoop status signals over signal lines 254 and which may mask those internal snoop status signals before driving them to the system bus 240 if a snoop error is asserted by the bus agent 242.

Considering the bus agent 202 to be the first agent referred to in the method of FIG. 1, and the bus agent 242 to be the second, the operation of one embodiment of the system of FIG. 2, may be further explained with reference to a number of the steps illustrated in FIG. 1. For example, the step 105 of generating a snoop cycle may be performed when the processor core 204 performs a write cycle to the cache 206. In conjunction with this write cycle, the snoop request circuit 230 places a snoop cycle on the system bus 240. In response to the snoop cycle, the snoop request circuit 270 of the second bus agent 242 sends the snoop address to the cache 246. If corrupted bits are detected in the cache (for example, in the tags 248), the snoop error detect circuit 252 asserts the snoop error signal on the signal line 216. Thus, the snoop error detect circuit 252 determines whether the snoop address corresponds to a corrupt cache entry as shown in step 110. The step of signaling the snoop error on the bus, step 125, is also performed by the snoop error detect circuit 252.

After sampling the system cache status signals as shown in step 130, the snoop status decode circuit 224 of the first bus agent 202 then determines whether valid data is available from another source in the system. As shown in step 135, this may be accomplished by analyzing the snoop status signals. The bus agent 202 can then appropriately respond by either executing an error response routine as indicated in steps 150 and 160, or by ignoring the snoop error as shown in step 140 because the snoop status signals indicate that valid data is available from another cache.

Figure 3:
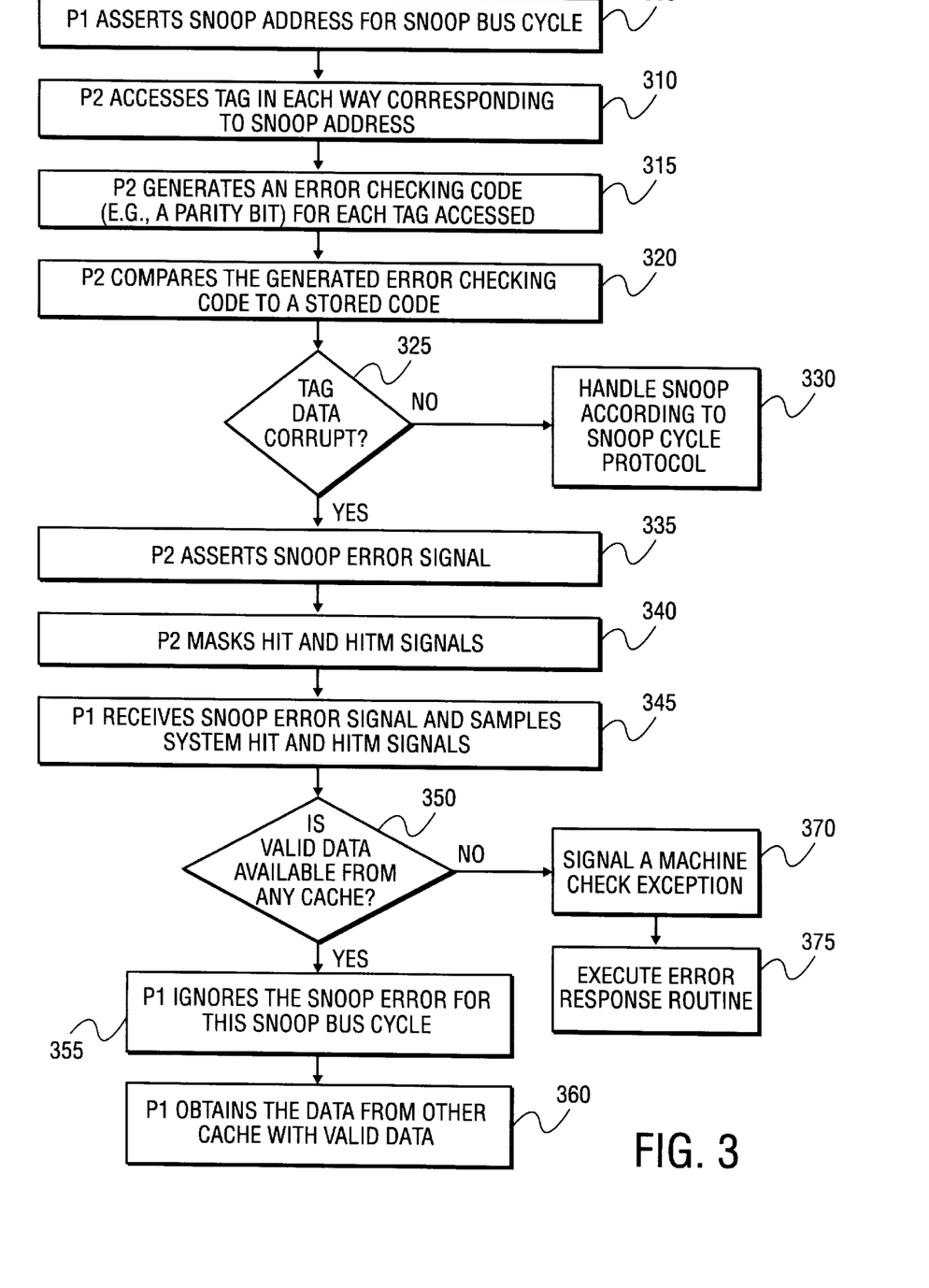
FIG. 3 illustrates one embodiment of a method for detecting and handling snoop errors caused by a corrupt tag according to the present invention.
Figure 4:
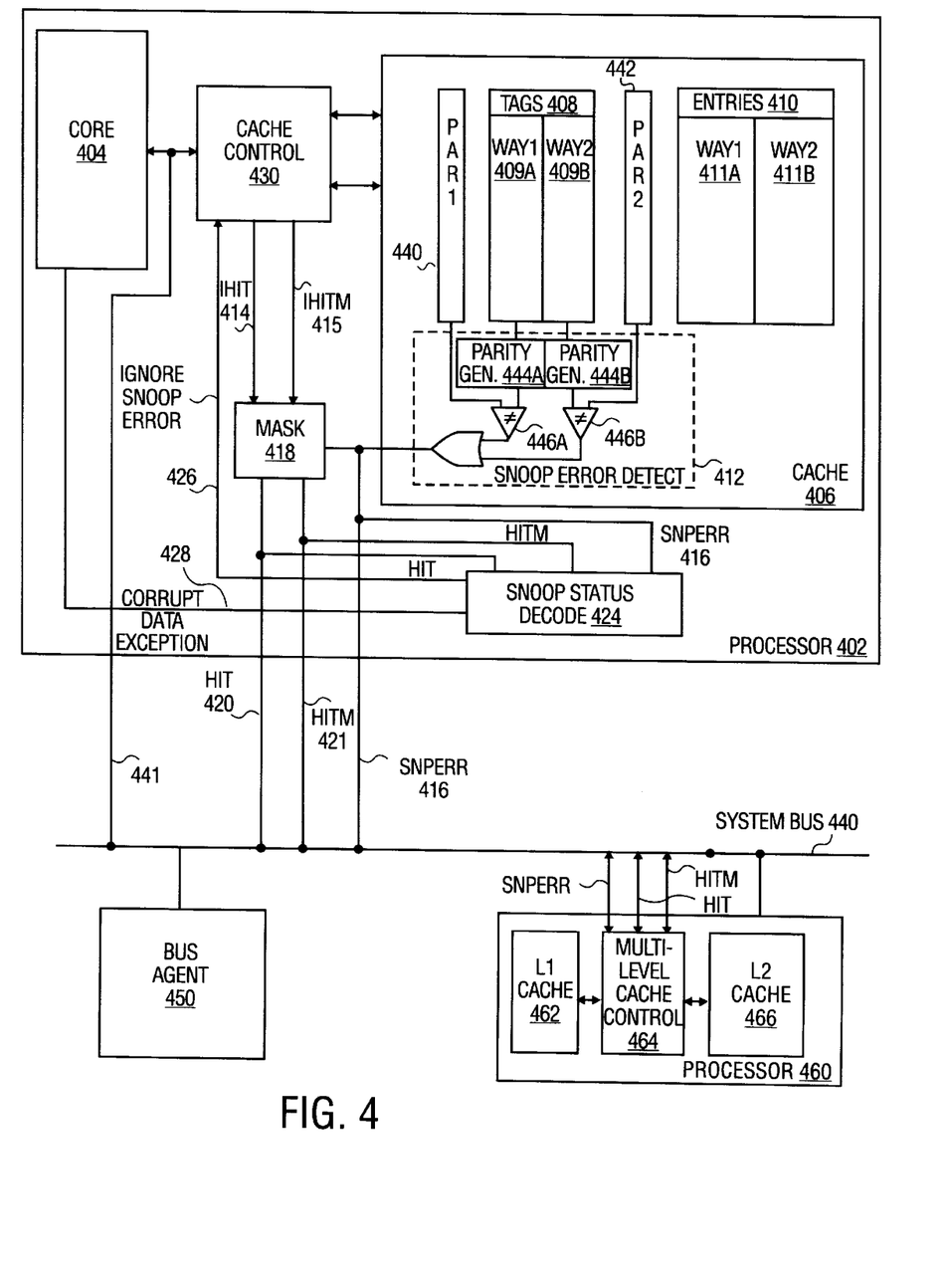
FIG. 4 illustrates one embodiment of a system of the present invention which may handle snoop errors caused by corrupted cache tags according to the method shown in FIG. 3.

While the method and apparatus of FIGS. 1 and 2 provide techniques for handling any type of cache snoop error, FIG. 3 illustrates a method for handling snoop errors caused by a corrupt tag in a system memory. FIG. 4 illustrates one system capable of signaling and responding to such snoop errors; however, the internal details of all of the bus agents in FIG. 4 are not detailed as they are for the processor 402. In one embodiment, the bus agent 450 of FIG. 4 may be a second processor with substantially the same internal circuitry as processor 402 such that the bus agent 450 functions as the second processor discussed with respect to method illustrated in FIG. 3.

In step 305, the first processor, processor 402, asserts a snoop address for a snoop bus cycle. The snoop bus cycle is asserted by a cache control circuit 430 which communicates with a processor core 404 and a cache 406 to determine when such a snoop cycle is necessary. The snoop cycle is asserted via signal lines 441 to the system bus 440.

In step 310, the second processor accesses a tag corresponding to the snoop address in each way of its cache. Circuitry similar to that shown in the processor 402 performs this task for the bus agent 450 which is the second processor (P2) in one embodiment. As shown for the processor 402, the cache control circuit 430 passes the snoop address to a tag array 408 in the cache 406. As illustrated, the cache is a two-way set associative cache and accordingly has a first array of tags 409A for way 1, and a second array of tags 409B for way 2. According to techniques known in the art, the snoop address may be looked up in the tag array 408 to determine whether a cache hit occurs. In such a set-associative cache, a limited number of tags need to be tested for whether a cache hit has occurred. Such tags are passed from the tag array 408 to parity generators 444A and 444B in a snoop error detect circuit 412. As shown in step 315, these parity generators generate an error checking code, in this case a parity bit, for each tag which was accessed. In other embodiments, other types of error checking codes may be used, and different cache arrangements involving different numbers of ways may also be used with appropriate changes to the error correction code generation circuitry.

In addition to the parity generators 444A and 444B, the snoop error detect circuit 412 includes first and second comparators 446A and 446B and an OR gate 448. The first comparator 446A is coupled to receive a stored parity bit from a first parity array 440. Each stored parity bit in the first parity array 440 corresponds to a tag in the first array of tags 409A. When a particular tag is accessed in the first array of tags 409A, the corresponding parity bit stored in the first parity array 440 is provided to the comparator 446A. The first comparator 446A asserts its output signal when the stored parity bit does not match the generated parity bit from the parity generator 440A. Similarly, the second comparator 446B is coupled to receive stored parity bits from a second parity array 442 which correspond to tags stored in the second array of tags 409B. Again, if a mismatch between the stored and generated parity bits occurs, the comparator 446B asserts its output signal. Thus, the snoop error detect circuit 412 compares the generated error checking code (the generated parity bit) to a stored code (the stored parity bits) as illustrated in step 320.

By combining the output signals of the first comparator 446A and the second comparator 446B, the OR gate 448 detects whether the tag data is corrupt as shown in step 325. If either or both of the outputs of the comparators 446A and 446B are asserted, the tag data is deemed to be corrupted, and the snoop error signal is asserted on the snoop error line 416 by the OR gate 448 as illustrated in step 335. Either one of the tags being corrupted is a sufficient condition to cause a snoop error because the corrupt tag indicates that there could have been a valid entry in the array of entries 410 (in either a first way 411A or a second way 411B ) which contained valid data not held by other system memories.

Although it is not separately shown, the cache 406 contains tag comparison circuitry as is normally included in a cache memory. This tag comparison circuitry tests whether addresses match any of the cache entries by comparing those addresses to the tag entries. In the case of a snoop bus cycle, the cache control circuit 430 passes the snoop address to the cache 406 which returns signals indicating whether the address was present in the cache and therefore whether a hit occurred. Additionally, the cache 406 indicates whether the data (if found in the cache) is modified cache data which may not be present in its most recent form in other memories in the system.

In one embodiment, the cache control circuit 430 indicates cache hits by asserting either an internal hit signal (IHIT) or an internal hit modified (IHITM) signal on respectively signal lines 414 and 415. If a cache hit occurred in the cache 406 as well as a snoop error, valid data can not be obtained from the cache 406 and a mask circuit 418 accordingly masks internal hit signals as shown in step 340. Thus, HIT and HITM signals are generated on the signal lines 420 and 421 which are coupled to the system bus 440. It is again to be noted that the steps in FIG. 3 performed by the second processor P2 (namely steps 310, 315, 320, 325, 335, and 340) are performed by the bus agent 450 in one embodiment using circuitry analogous to that shown and that discussed with respect to the first processor 402.

In step 345, the first processor 402, which asserted the snoop bus cycle, receives the results of that snoop bus cycle. Specifically the processor 402 receives the snoop error signal and samples the system HIT and HITM signals. A snoop status decode circuit 424 receives these signals and determines whether valid data is available from any cache as shown in step 350. Since hits from caches with corrupted entries are masked by mask circuitry in this embodiment, the HIT and HITM signals which are shared amongst bus agents on the system bus should only be asserted when a non-corrupt entry is available in a system cache. Thus, the snoop status decode circuit 424 can detect whether valid data is available in any cache by sensing the HIT and HITM signals. If such valid data is available, the processor can ignore the snoop error as shown in step 355.

An ignore snoop error signal may be asserted on a signal line 426 to indicate to the cache control circuit 430 that the snoop error may be ignored. The cache control circuit 430, receiving all of the necessary control signals such as the HIT and HITM signals, then handles the snoop cycle according to its cache protocol. Thus, once it has been determined that the snoop error may be ignored, the snoop cycle may be handled (as also shown in step 330) according to the snoop cycle protocol which would be used if tag data corruption had not occurred. Step 360 indicates that where the HIT or HTIM signal is asserted, the first processor may obtain the data from the asserting cache.

If neither the HIT nor HITM signal is asserted when a snoop error occurs, it will be determined in step 350 that valid data is not available from another system cache. Thus, as shown in step 370, a machine check exception is asserted. As illustrated for processor 402, the snoop status decode circuit 424 can assert a corrupt data exception signal on a signal line 428 to the core 404. In response, the core 404 executes an error response routine as shown in step 375 to appropriately handle the corrupt data problem. Since both the processor generating the snoop cycle and the processor with the corrupt data are aware via the system HIT, HITM, and snoop error signals that no valid data is available, either or both of these processors may generate an exception. The processor generating the snoop bus cycle is likely to be adversely affected by the corrupt tag since it has specifically requested that data. Thus, it may be appropriate to deal with the corrupt data before proceeding with operations which may otherwise be incorrect.

In addition to implementing snoop error handling logic for each single system cache memory, some or all of the bus agents in this system may include multiple levels of caches as shown in processor 460. The processor 460 includes an L1 cache 462 and a L2 cache 466. A multi-level cache control circuit 464 implements a snoop error handling algorithm by testing the status of both the L1 cache 462 and the L2 cache 466 when asserting this snoop error signal and when generating and/or masking HIT and HITM signals. Similarly, the techniques of the present invention could be expanded to additional levels of caching including caches on separate buses separated by cluster managers or other bus bridges.

Thus, the present invention provides a method and apparatus for handling some cache snoop errors in a variety of contexts. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method comprising:
    detecting a snoop error in a second bus agent in response to a bus cycle from a first bus agent;
    signaling that the snoop error has occurred to the first bus agent;
    maintaining deasserted or deasserting of hit signals by the second bus agent;
    determining whether the snoop error may be ignored by:
        detecting whether any cache memories assert a first system hit signal or a second system hit signal in response to the bus cycle from the first bus agent; and
        ignoring the snoop error signal if either the first system hit signal or the second system hit signal is asserted;
    receiving data from an alternative bus agent if either of the first system hit signal or the second system hit signal is asserted by the alternative bus agent, the alternative bus agent being a bus agent other than the first bus agent and second bus agent.

2. The method of claim 1 further comprising asserting a snoop error signal during a snoop cycle.

3. The method of claim 1, further comprising:
    invoking a routine to the snoop error if the snoop error may not be ignored.

4. The method of claim 1 wherein detecting comprises the step of detecting at least one corrupted bit in a memory cell in the second bus agent.

5. The method of claim 1 wherein detecting further comprises performing an error check on a plurality of tag bits in a second bus agent cache wherein performing further comprises comparing a stored tag parity bit to a generated tag parity bit.

6. The method of claim 1 wherein the second bus agent has a second bus agent cache and determining further comprises:
    ignoring the snoop error if any system cache other than the second bus agent cache asserts a hit signal; and
    ignoring the snoop error if any system cache asserts a hit modified signal.

7. The method of claim 1 wherein the snoop error is indicated by a snoop error signal generated by a corrupted cache having a cache entry which fails an error checking test, wherein maintaining hit signals deasserted or deasserting hit signals comprises:
    masking a local HIT signal and a local HITM signal from the corrupted cache which asserts the snoop error signal;
    and wherein the first system hit signal is a HIT signal and the second system hit signal is a HITM signal.

8. A method comprising:
    asserting an address to a plurality of system caches;
    testing whether the address indicates a corrupt tag entry in one of the plurality of system caches;
    signaling a snoop error to the plurality of system caches if the address matches the corrupt tag entry; and
    deciding, based on a plurality of hit signals from the plurality of system caches, if the snoop error may be at least temporarily ignored.

9. The method of claim 8 wherein deciding further comprises deciding if the snoop error may be ignored by a bus agent which asserted the address and during a bus cycle in which the address is asserted.

10. A method comprising:
    asserting an address which is also a snoop address for a requested bus cycle, the asserting being done by a first bus agent;
    accessing, in a second bus agent cache of a second bus agent, a tag of a possible location for a cache entry corresponding to the snoop address;
    detecting whether the tag corresponding to the possible location of the cache entry is a corrupt tag;
    generating a generated error checking code for the tag to determine if a tag bit is corrupted;
    comparing the generated error checking code to a stored error checking code;
    if the comparing of the generated error checking code to stored error checking code indicates an error, then asserting a snoop error signal, the asserting being done by the second bus agent;
    receiving the snoop error signal and a plurality of other cache status signals;
    determining based on the plurality of other cache status signals if valid data corresponding to the snoop address is available from an alternate system cache memory;
    if valid data corresponding to the snoop address is available from the alternate system memory, then obtaining the valid data from the alternate system memory; and
    if valid data corresponding to the snoop address is not available, then executing a routine responsive to the snoop error signal.

11. The method of claim 10 further comprising masking a HIT or HITM signal generated by the second bus agent if the snoop error signal is asserted by the second bus agent.

12. The method of claim 10 wherein the second bus agent cache is a two way set associative cache and wherein the tag is a way one tag and the possible location is a way one location, and wherein the method further comprises comparing the snoop address using a second tag which is a way two tag to test a second possible location which is a way two location.

13. A snoop error response mechanism for a multiple cache system, comprising:
  a snoop error detect circuit coupled to receive a snoop address and to generate a snoop error signal to provide to other caches if an error exists at a cache location in a first cache memory indicated by the snoop address;
  a snoop status decode circuit coupled to receive the snoop error signal and coupled to receive a hit signal from a second cache memory in response to said snoop address, the snoop status decode circuit indicating that the snoop error signal can be ignored if the hit signal indicates that valid data corresponding to the snoop address is available from the second cache memory.

14. The snoop error response mechanism of claim 13 wherein the snoop error response mechanism initiates a error response routine in response to the snoop error signal if current data corresponding to the snoop address is not available from any system cache memory.

15. A bus agent comprising:
  a processor core;
  a first cache memory coupled to the processor core; and
  a snoop error detect circuit coupled to the first cache memory to detect a snoop error which occurs in response to a snoop request and to externally generate a snoop error signal in response to the snoop error;
  a snoop status decode circuit coupled to receive the snoop error signal and a plurality of snoop status signals comprising a first hit signal and a second hit signal from at least one alternate cache memory and capable of determining whether the plurality of snoop status signals indicate that the at least one alternate cache memory contains valid data for a snoop address indicated by the snoop request if one of the first hit signal and the second hit signal is asserted in response to the snoop request such that the snoop error may be ignored by the bus agent.

16. A system comprising:
  a system bus;
  a snooping bus agent comprising:
    a snoop request circuit coupled to generate a snoop address on the system bus;
    a snoop status decode circuit coupled to receive a plurality of snoop status signals including a snoop error signal and a plurality of hit signals, wherein the snoop status decode circuit is to generate signals such that the snooping bus agent ignores the snoop error signal if at least one of the plurality of hit signals indicates that valid data is available for the snoop address from a system cache memory other than the first responding bus agent cache memory;
  a first responding bus agent comprising:
    a first responding bus agent cache memory; and
    a snoop error detect circuit coupled to the first cache memory to assert the snoop error signal in response to a snoop error detected when snooping the first responding bus agent cache memory in response to the snoop address on the system bus.

17. The system of claim 16 wherein the snoop error signal indicates when a cache tag parity error occurs.

18. The system of claim 16, further comprising:
  a second responding bus agent comprising:
    a second responding bus agent cache memory which contains an entry corresponding to the snoop address; and
    a second snoop request circuit coupled to receive the snoop address and to initiate snooping of the second responding bus agent cache memory, the second snoop request circuit asserting at least one of the plurality of hit signals to indicate that a valid copy of the entry corresponding to the snoop address is present in the second responding bus agent cache memory to the snoop status decode circuit of the snooping bus agent.

19. The system of claim 16 wherein the snooping bus agent further comprises a second snoop error detect circuit coupled to a snooping bus agent cache memory to assert the snoop error signal in response to an error detected when snooping the snooping bus agent cache memory.

20. The system of claim 19 wherein the first responding bus agent further comprises:
  a second snoop request circuit coupled to the first responding bus agent cache memory; and
  a second snoop status decode circuit coupled to receive the plurality of snoop status signals including the snoop error signal.

* * * * *